United States Patent
Dai et al.

(10) Patent No.: US 11,975,736 B2
(45) Date of Patent: May 7, 2024

(54) VEHICLE PATH PLANNING

(71) Applicant: Ford Global Technologies, LLC, Dearborn, MI (US)

(72) Inventors: Qi Dai, Novi, MI (US); Jinhong Wang, Ann Arbor, MI (US); Wen Guo, Dearborn, MI (US); Xunnong Xu, Ann Arbor, MI (US); Suzhou Huang, Ann Arbor, MI (US); Dimitar Petrov Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 466 days.

(21) Appl. No.: 17/004,342

(22) Filed: Aug. 27, 2020

(65) Prior Publication Data

US 2022/0063651 A1 Mar. 3, 2022

(51) Int. Cl.
*B60W 60/00* (2020.01)
*B60W 10/18* (2012.01)
(Continued)

(52) U.S. Cl.
CPC .......... *B60W 60/001* (2020.02); *B60W 10/18* (2013.01); *B60W 10/20* (2013.01);
(Continued)

(58) Field of Classification Search
CPC .... B60W 60/001; B60W 10/18; B60W 10/20; B60W 30/085; B60W 30/18163; B60W 50/06; B60W 2554/40; B60W 2050/0083; B60W 2556/45; B60W 60/00276; G01C 21/3407; G01C 21/3492; G01C 21/3691;
(Continued)

(56) References Cited

U.S. PATENT DOCUMENTS 11,199,853 B1 * 12/2021 Afrouzi ................ G05D 1/0246
2010/0228419 A1 * 9/2010 Lee ....................... B62D 15/0255
701/25
(Continued)

FOREIGN PATENT DOCUMENTS

CN 110362910 A1 10/2019
EP 3654246 A1 * 5/2020

OTHER PUBLICATIONS

Ward et al. (2016) "Dynamic calibration of agent-based models using data assimilation," Royal Society Open Science (https://royalsocietypublishing.org/doi/10.1098/rsos.150703). (Year: 2016).*
(Continued)

*Primary Examiner* — Hunter B Lonsberry
*Assistant Examiner* — Daniel M. Robert
(74) *Attorney, Agent, or Firm* — Frank A. MacKenzie; Bejin Bieneman PLC

(57) ABSTRACT

A computer, including a processor and a memory, the memory including instructions to be executed by the processor to calibrate utility functions that determine optimal vehicle actions based on an approximate Nash equilibrium solution for multiple agents by determining a difference between model-predicted future states for the multiple agents to observed states for the multiple agents. The instructions can include further instructions to determine a vehicle path for a vehicle based on the optimal vehicle actions.

20 Claims, 7 Drawing Sheets

(51) Int. Cl.
| | |
|---|---|
| B60W 10/20 | (2006.01) |
| B60W 30/085 | (2012.01) |
| B60W 30/18 | (2012.01) |
| B60W 50/06 | (2006.01) |
| G01C 21/34 | (2006.01) |
| G01C 21/36 | (2006.01) |
| G08G 1/00 | (2006.01) |
| G08G 1/01 | (2006.01) |
| G08G 1/052 | (2006.01) |
| G08G 1/056 | (2006.01) |

(52) U.S. Cl.
CPC .... *B60W 30/085* (2013.01); *B60W 30/18163* (2013.01); *B60W 50/06* (2013.01); *G01C 21/3407* (2013.01); *G01C 21/3492* (2013.01); *G01C 21/3691* (2013.01); *G08G 1/0116* (2013.01); *G08G 1/052* (2013.01); *G08G 1/056* (2013.01); *G08G 1/20* (2013.01); *B60W 2554/40* (2020.02)

(58) Field of Classification Search
CPC ...... G08G 1/0116; G08G 1/052; G08G 1/056; G08G 1/20; G08G 1/0133; G08G 1/096816
See application file for complete search history.

(56) References Cited

U.S. PATENT DOCUMENTS

| | | | | |
|---|---|---|---|---|
| 2011/0250917 | A1* | 10/2011 | Zhu | H04W 24/02 455/509 |
| 2015/0142292 | A1* | 5/2015 | Kastner | B60W 40/04 701/96 |
| 2018/0286242 | A1* | 10/2018 | Talamonti | B62D 15/025 |
| 2020/0086859 | A1 | 3/2020 | McGill, Jr. et al. | |
| 2020/0198638 | A1 | 6/2020 | Voelz | B60W 60/00276 |
| 2021/0146919 | A1* | 5/2021 | Xu | G08G 1/096725 |
| 2021/0146964 | A1* | 5/2021 | Rus | B60W 60/0015 |
| 2021/0245779 | A1* | 8/2021 | Suzuki | B60W 50/10 |
| 2022/0032960 | A1* | 2/2022 | Wang | B60W 30/16 |
| 2022/0048527 | A1* | 2/2022 | Geiger | B60W 50/0097 |
| 2022/0147847 | A1* | 5/2022 | Mguni | G06N 3/006 |

OTHER PUBLICATIONS

Williams, et al., "Best response model predictive control for agile interactions between autonomous ground vehicles," in 2018 IEEE International Conference on Robotics and Automation (ICRA), May 2018. (Year: 2018).*

Wang et al., "Game Theoretic Planning for Self-Driving Cars in Competitive Scenarios," in Robotics, Science and Systems XV, Jun. 2019. (Year: 2019).*

Spica et al. "A real-time game theoretic planner for autonomous two player drone racing," in Proceedings of Robotics: Science and Systems, Jun. 2018, https://ieeexplore.ieee.org/stamp/stamp.jsp?tp=&arnumber=9112709. (Year: 2018).*

En.wikipedia.org s.v. "Nash Equilibrium," accessed Apr. 10, 2023 https://en.wikipedia.org/wiki/Nash_equilibrium (Year: 2023).*

Reddy et al., "Open-loop and feedback Nash equilibria in constrained linear-quadratic dynamic games played over event trees," Automatica 107, Sep. 2019, 162-174, https://www.sciencedirect.com/science/article/pii/S0005109819302614 (Year: 2019).*

Wimpee, "Finding Nash equilibria in two-player, zero sum games" Computer Science Graduate and Undergraduate Student Scholarship, 2008, 3. https://cedar.wwu.edu/computerscience_stupubs/3 (Year: 2008).*

Engwerda et al., "Feedback Nash equilibria for linear quadratic descriptor differential games," Automatica 48, issue 4, Apr. 2012, 625-631, https://www.sciencedirect.com/science/article/pii/S0005109812000180 (Year: 2012).*

Engwerda et al., "Feedback Nash equilibria in uncertain infinite time horizon differential games," 2000, https://www.researchgate.net/publication/228990725_Feedback_Nash_equilibria_in_uncertain_infinite_time_horizon_differential_games (Year: 2000).*

Sadana et al., "Feedback Nash Equilibria in Differential Games With Impulse Control," IEEE Transactions of Automatic Control 68, No. 8, Aug. 2023, https://ieeexplore.ieee.org/stamp/stamp.jsp?arnumber=9889180 (Year: 2023).*

Abbott et al., "On Algorithms for Nash Equilibria," Dec. 16, 2004, chrome-extension://efaidnbmnnnibpcajpcglclefindmkaj/https://web.mit.edu/tabbott/Public/final.pdf (Year: 2004).*

Abbeel et al., "Apprenticeship Learning via Inverse Reinforcement Learning", Appearing in Proceedings of the 21 st International Conference on Machine Learning, Banff, Canada, 2004.

Finn et al., "Model-Agnostic Meta-Learning for Fast Adaptation of Deep Networks", Proceedings of the 34th International Conference on Machine Learning, Sydney, Australia, PMLR 70, 2017; arXiv:1703.03400v3 [cs.LG] Jul. 18, 2017.

Ng et al., "Algorithms for Inverse Reinforcement Learning", A. Ng is supported by a Berkeley fellowship; this work was also support4ed by NFS ECS-9873474; Apr. 4, 2007.

Schwarting et al., "Social behavior for autonomous vehicles", PNAS. Dec. 10, 2019. vol. 116, No. 50, www.pnas.3rglcgildoil10.1073Ipnas_1820676116.

Ziebart et al., "Maximum Entropy Inverse Reinforcement Learning", Copyright 2010, Association for the Advancement Of Artificial Intelligence (www.aaai.org).

* cited by examiner

VEHICLE PATH PLANNING

BACKGROUND

Vehicles can be equipped with computing devices, network devices, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
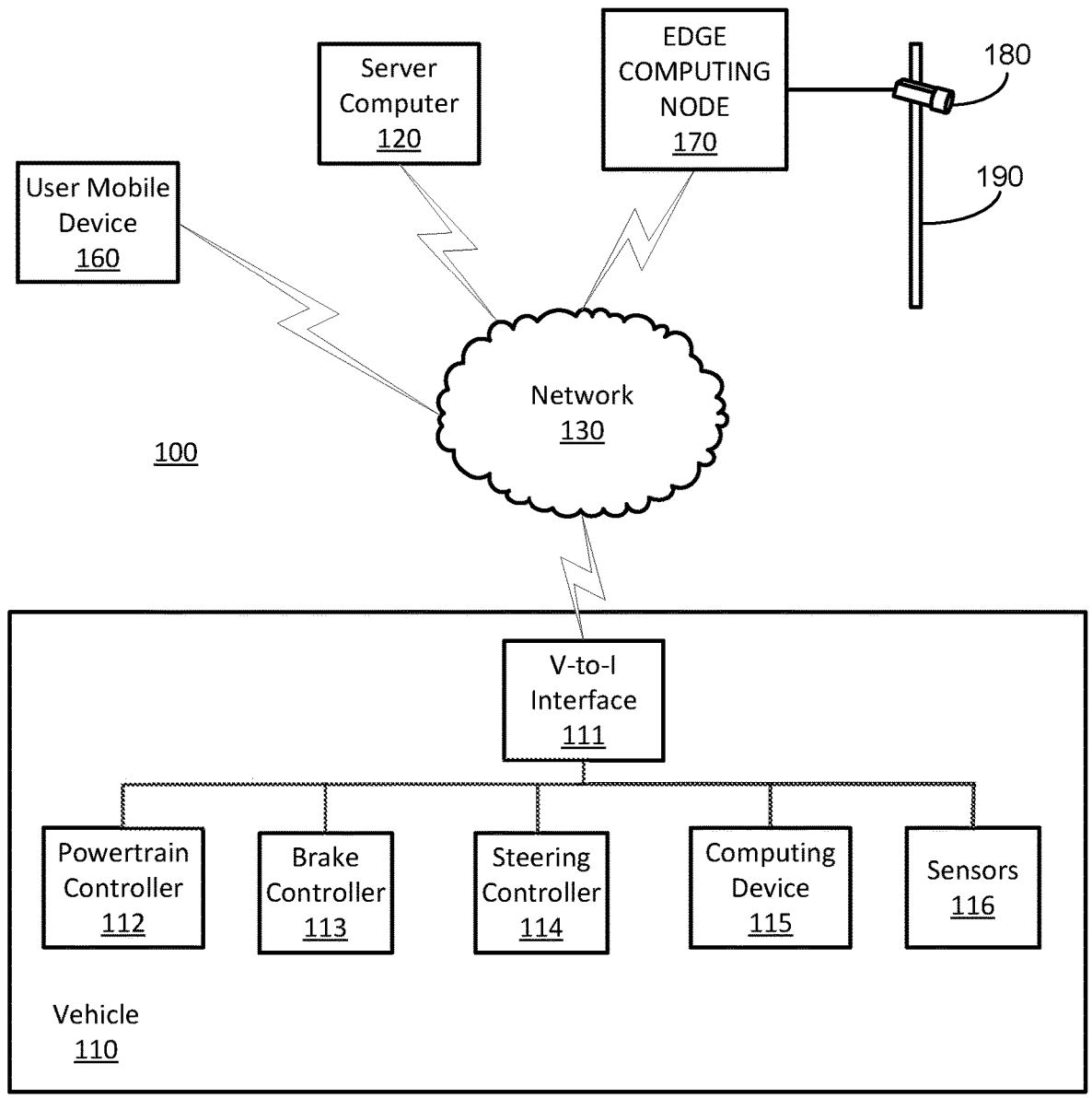
FIG. 1 is a diagram of an example traffic infrastructure system.

A computing device in a traffic infrastructure system can be programmed to acquire data regarding the external environment of a vehicle and to use the data to determine a vehicle path upon which to operate a vehicle in an autonomous or semi-autonomous mode. A vehicle can operate on a roadway based on a vehicle path by determining commands to direct the vehicle's powertrain, braking, and steering components to operate the vehicle to travel along the path. The data regarding the external environment can include the location and orientation of one or more moving objects such as vehicles and pedestrians, etc., in an environment around a vehicle and can be used by a computing device in the vehicle to operate the vehicle.

The computing device in a traffic infrastructure system can determine a vehicle path upon which to operate a vehicle based on modified version of a Nash equilibrium solution to a multiple agent game, wherein the Nash equilibrium solution is modified by performing a grid search optimization technique based on rewards and penalties for the agents to determine optimal vehicle actions in real-time at sub-second frequency, i.e. at least 5 Hz. The multiple agents can include one or more of autonomous vehicles, non-autonomous vehicles, stationary objects, and non-stationary objects including pedestrians. The rewards and the penalties for the agents can be determined by simulating behavior of the agents to determine possible future states for the agents to determine the vehicle path.

The modified version of a Nash equilibrium solution can be calibrated to accurately predict actions for multiple agents by acquiring real world data regarding the motion of agents. The real world data can be used off-line to calibrate utility functions that govern the actions of the agents. In operation, limited data can be acquired by a traffic infrastructure system regarding multiple agents in a field of view. The calibrated utility functions can be re-calibrated based on the acquired limited data and thereby improve the accuracy of prediction of motions of the agents.

Disclosed herein is method including calibrating utility functions that determine optimal vehicle actions based on an approximate Nash equilibrium solution for multiple agents by determining a difference between model-predicted states for the multiple agents and observed states for the multiple agents and determining a vehicle path for a vehicle based on the optimal vehicle actions. The difference between the model-predicted states for the agents and the observed states can include a noise term that is normally distributed with a constant covariance. Calibrating the utility functions by minimizing a cost function can be determined by the difference between the possible model-predicted states to the observed states. Determining the observed states can be based on sensor data acquired from sensors included in a traffic infrastructure system arranged to observe the multiple agents. The utility functions can simulate behavior of the multiple agents to determine the possible future states for the multiple agents based on determining one or more of each of agents' locations, agents' velocities, where velocity includes speed and heading, and one or more possible paths for each agent. The utility functions can include parameters that determine rewards and penalties for actions of each of the multiple agents based on estimated states of the multiple agents at future time steps t included within a time horizon h.

The approximate Nash equilibrium solution can perform an adaptive grid search optimization technique to determine the optimal vehicle actions based on estimating the possible future states of the multiple agents, wherein the multiple agents include one or more of autonomous vehicles, non-autonomous vehicles, stationary objects, and non-stationary objects including pedestrians and the possible future states are estimated by simulating behavior of the multiple agents based on the utility functions to determine the possible future states for the multiple agents. The utility functions can include one or more of moving forward at a desired speed and deviating from smooth vehicle operation, wherein the smooth vehicle operation includes limits on agent acceleration, agent steering and agent braking. The utility functions can include one or more of lane departure, out of roadway departure, collisions with stationary objects, and collisions with non-stationary objects. The vehicle path can be based on the optimal vehicle actions is determined based on polynomial functions. Determining the vehicle path for the vehicle can be based on the optimal vehicle actions and to download the vehicle path to a second computer including a second processor and second memory included in the vehicle. The second computer can include instructions to operate the vehicle along the vehicle path by controlling vehicle powertrain, vehicle steering and vehicle brakes. Determining the difference between model-predicted states for the multiple agents and observed states for the multiple agents can include determining local minima for a cost function. Determining local minima can include applying gradient descent to a cost function.

Further disclosed is a computer readable medium, storing program instructions for executing some or all of the above method steps. Further disclosed is a computer programmed for executing some or all of the above method steps, including a computer apparatus, programmed to calibrate utility functions that determine optimal vehicle actions based on an approximate Nash equilibrium solution for multiple agents by determining a difference between model-predicted states for the multiple agents and observed states for the multiple agents and determine a vehicle path for a vehicle based on the optimal vehicle actions. The difference between the model-predicted states for the agents and the observed states can include a noise term that is normally distributed with a constant covariance. Calibrating the utility functions by minimizing a cost function can be determined by the difference between the possible model-predicted states to the observed states. Determining the observed states can be based on sensor data acquired from sensors included in a traffic infrastructure system arranged to observe the multiple agents. The utility functions can simulate behavior of the multiple agents to determine the possible future states for the multiple agents based on determining one or more of each of agents' locations, agents' velocities, where velocity includes speed and heading, and one or more possible paths for each agent. The utility functions can include parameters that determine rewards and penalties for actions of each of the multiple agents based on estimated states of the multiple agents at future time steps t included within a time horizon h.

The computer can be further programmed to perform an adaptive grid search optimization technique using an approximate Nash equilibrium solution to determine the optimal vehicle actions based on estimating the possible future states of the multiple agents, wherein the multiple agents include one or more of autonomous vehicles, non-autonomous vehicles, stationary objects, and non-stationary objects including pedestrians and the possible future states are estimated by simulating behavior of the multiple agents based on the utility functions to determine the possible future states for the multiple agents. The utility functions can include one or more of moving forward at a desired speed and deviating from smooth vehicle operation, wherein the smooth vehicle operation includes limits on agent acceleration, agent steering and agent braking. The utility functions can include one or more of lane departure, out of roadway departure, collisions with stationary objects, and collisions with non-stationary objects. The vehicle path can be based on the optimal vehicle actions is determined based on polynomial functions. Determining the vehicle path for the vehicle can be based on the optimal vehicle actions and to download the vehicle path to a second computer including a second processor and second memory included in the vehicle. The second computer can include instructions to operate the vehicle along the vehicle path by controlling vehicle powertrain, vehicle steering and vehicle brakes. Determining the difference between model-predicted states for the multiple agents and observed states for the multiple agents can include determining local minima for a cost function. Determining local minima can include applying gradient descent to a cost function.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather (precipitation, external ambient temperature, etc.) and lighting conditions, the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Traffic infrastructure system 100 can include one or more edge computing nodes 170. Edge computing nodes 170 are computing devices as described above that can be located near roadways, and can be in communication with stationary or moveable sensors. For example, a stationary video camera 180 can be attached to a pole 190, building, or other structure to give the video camera 180 a view of traffic. Mobile sensors can be mounted on drones or other mobile platforms to provide views of traffic from positions not available to stationary sensors. Edge computing nodes 170 further can be in communication with computing devices 115 in vehicle 110, server computers 120, and user mobile devices 160 such as smart phones. Server computers 120 can be cloud-based computer resources that can be called upon by edge computing nodes 170 to provide additional computing resources when needed.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
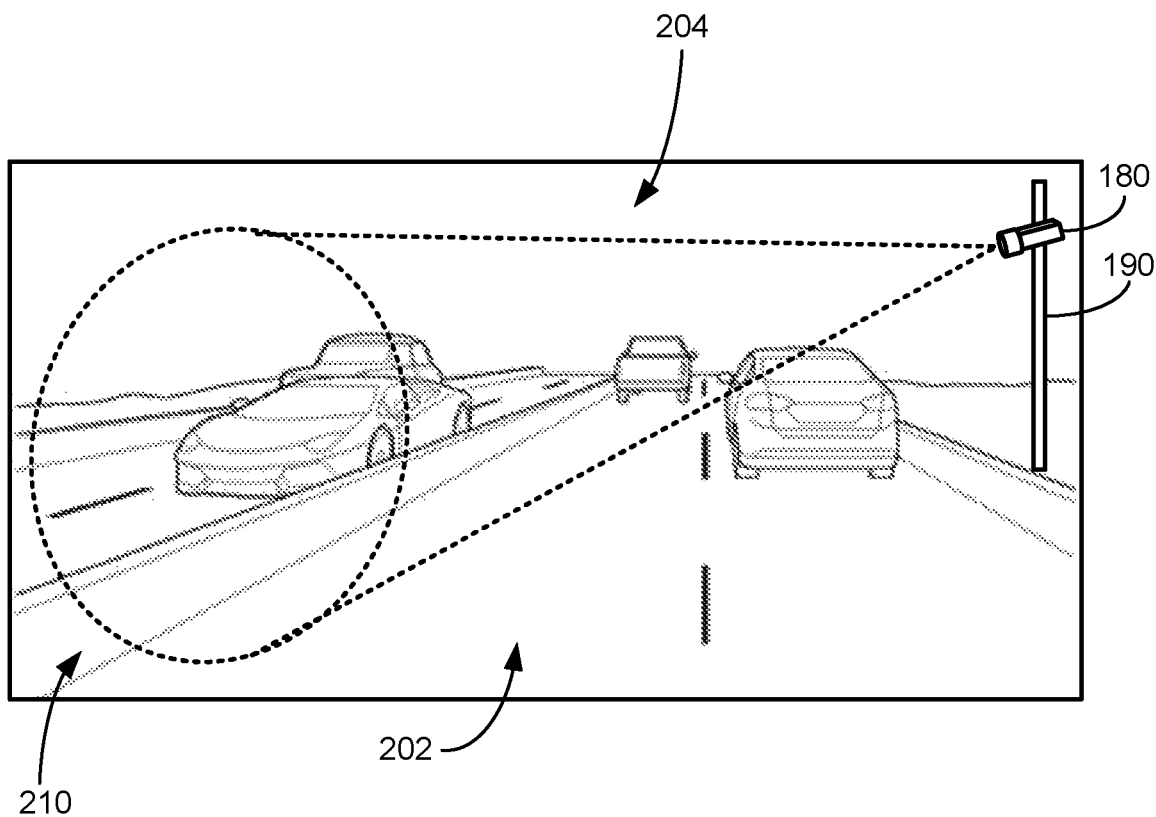
FIG. 2 is a diagram of an example traffic scene.

FIG. 2 is a diagram of a traffic scene 200. Traffic scene 200 includes a roadway 202 and multiple agents on the roadway 202 including vehicles 204. The multiple agents can include one or more of autonomous vehicles 204, non-autonomous vehicles 204, stationary objects, and non-stationary objects including pedestrians. Vehicles 204 can include autonomous and non-autonomous vehicles 204 as described above in relation to FIG. 1. Traffic scene 200 can also include a video camera 180 mounted on a pole 190 having a field of view 210. Mounting the video camera 180 on the pole 190 or other mounting structure such as a tower or building can provide video camera 180 with a field of view 210 of traffic that includes one or more agents including vehicles 204 traveling on the roadway 202. Video camera 180 can be in communication with a traffic infrastructure system 100 that acquires video data from video camera 180 regarding agents traveling on a roadway. Sensors included in a traffic infrastructure system 100 are not limited to video cameras 180. Sensors included in a traffic infrastructure system 100 can also include radar, lidar, etc., that can provide the same type of information as video cameras 180.

A traffic infrastructure system 100 can include a plurality of computing devices including a server computer 120. The traffic infrastructure system 100 can include one or more edge computing nodes 170 in communication with one or more video cameras 180 having fields of view 210 that acquire data regarding portions of a roadway 202. Edge computing nodes 170 can be included in a traffic infrastructure system 100 to acquire and process data from portions of a roadway 202. Edge computing nodes 170 can include a computing device 115 and server computer 120. Edge computing nodes 170 can be networked and joined together in groups that process data regarding contiguous portions of roadways 202, for example intersections. Groups of edge computing nodes 170 can be in communication with other computing devices in a traffic infrastructure system, for example server computers 120, that process data from a plurality of edge computing nodes 170 and make decisions regarding agent traffic in portions of a roadway 202.

Figure 3:
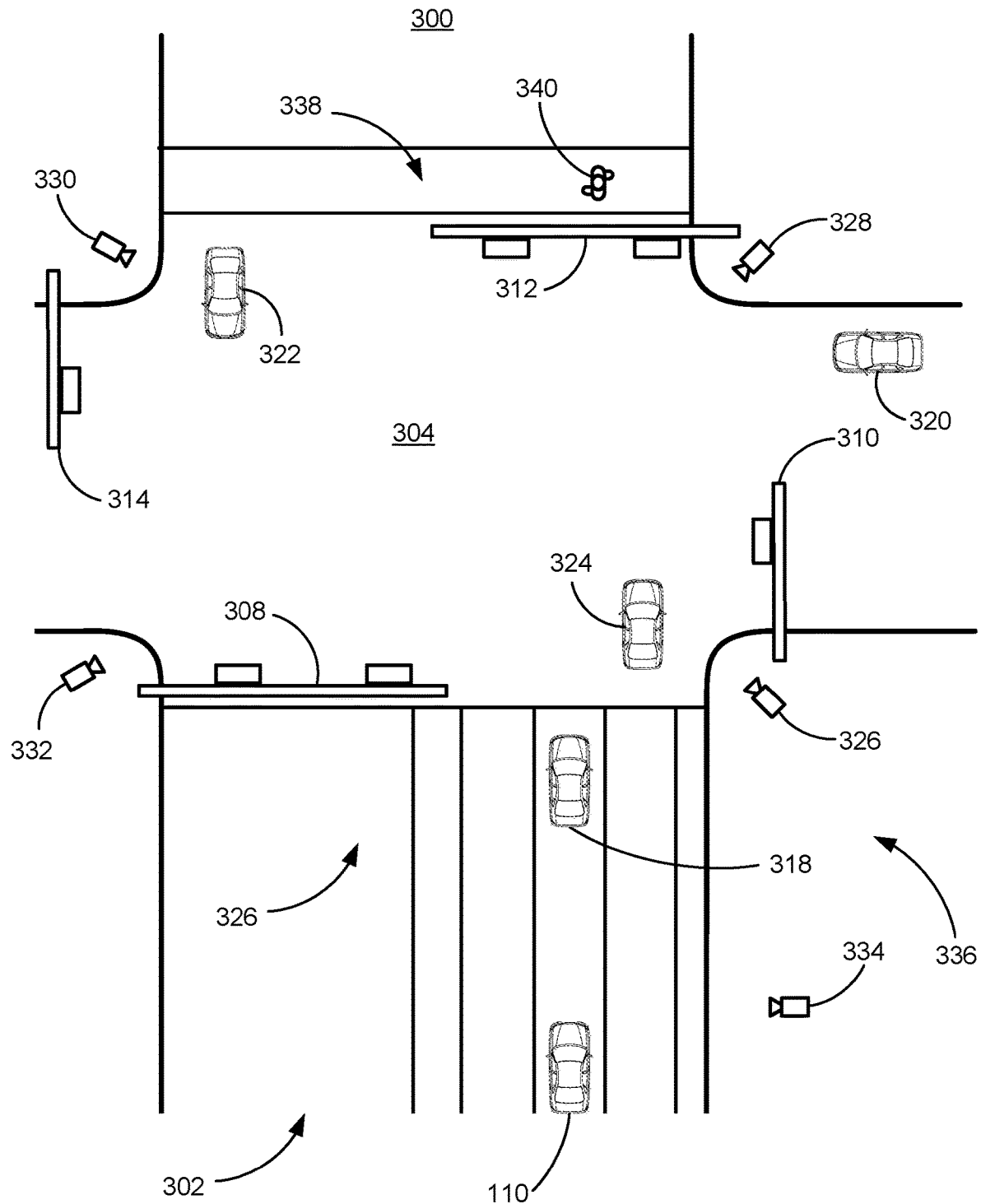
FIG. 3 is a diagram of an example top down view of another traffic scene.

FIG. 3 is a top-down diagram of another traffic scene 300. Traffic scene 300 includes roadways 302. Roadways 302 can intersect to form an intersection 304. Traffic approaching and traveling within the intersection 304 is controlled by traffic signals 308, 310, 312, 314. Traffic scene 300 including intersection 304 and portions of roadways 302 near the intersection 304 is observed by video cameras 326, 328, 330, 332, 334, collectively sensors 336 (which like the camera 180 described above are typically mounted to a pole 190 or other stationary structure to provide the sensors 336 with respective fields of view). Traffic scene 300 can also be observed by other sensors similarly mounted or deployed having fields of view including a portion of a roadway 302, including lidar and radar sensors, for example. Sensors 336 are in communication with one or more edge computer nodes 170 included in a traffic infrastructure system 100, which acquire and process video data from the sensors 336 about objects on roadways 302, which are referred to as agents. Agents can be divided into two groups: autonomous vehicle (AV) agents including vehicle 110 and other vehicles 318, 320, referred to herein as AV agents $I_a$ and non-autonomous vehicle (non-AV) agents. Non-AV agents include non-autonomous other vehicles 322, 334, living objects including pedestrian 340, and animals, etc., and static objects including debris, barriers, etc., referred to herein as non-AV agents $I_n$. AV agents $I_a$ include computing devices 115 that communicate with the traffic infrastructure system 100. Computing devices 115 included in the AV agents can be referred to as thin clients because most of the computing tasks included in determining vehicle paths is performed by the traffic infrastructure system 100 and downloaded to the AV agents.

Operating AV agents as thin clients can provide several advantages over distributing computing resources over multiple AV agents. Performing most of the computing tasks using computing devices in the traffic infrastructure system 100 permits the use of cloud-based computing resources, where computing resources are allocated and de-allocated depending upon the real-time requirements of the traffic infrastructure system 100. Processing software can be updated and otherwise maintained, without having to download and update software in individual AV agents. Finally, using a thin client permits the use of more limited computing resources in the AV clients, saving money and electrical power in the AV agents. In some examples the computation can also be done fully on-board a vehicle 110 by distributing the execution of an adaptiveSeek algorithm as described below in relation to FIGS. 5 and 6 to each vehicle agent. Computing vehicle paths using an adaptiveSeek algorithm as described herein using computing resources in each AV agent would have the advantages of using less training data and fewer computing resources than alternate techniques for determining vehicle paths in the presence of multiple agents but could eliminate the advantages of using a thin client. The set of all agents $I=\{I_a, I_n\}$ includes both AV and non-AV agents.

Based on communication with AV agents, the traffic infrastructure system 100 can predict destination and path data for each AV agent. The traffic infrastructure system 100 can also determine lane markings, roadway edges and traffic signs based on map data received from server computers 120 via a wide area network, the Internet, for example. The traffic infrastructure system 100 can also communicate with traffic signals 308, 310, 312, 314 to determine the state of the traffic signals 308, 310, 312, 314, i.e. which color light is currently energized and when the colors change. A traffic infrastructure system 100 can determine states of all agents with the fields of view of sensors 336 using edge computer nodes 170, where an agent state includes a location and a velocity, where velocity includes speed and heading. Static object states include locations and zero velocity. Based on map data regarding the roadway 302, data regarding the traffic signal 308, 310, 312, 314 states, data regarding AV agent $I_a$ destinations, and short-term estimates of non-AV agents $I_n$ based on a prescribed path scenario or action sequence, a decision-making function included in an edge computing node 170 included in a traffic infrastructure system 100 can determine optimal vehicle paths to download to AV agents $I_a$ that permit the AV agents $I_a$ to travel to their respective destinations with a prescribed speed while avoiding contact with other agents I. Prescribed path scenarios or action sequences can be determined, given the derived actions, using a generic kinematic model (further explained below) that determines future locations, speed, and directions for non-AV agents $I_n$ based on observed location, speed, and direction for each non-AV agent L.

Determining a vehicle path can include determining a vehicle path spline upon which to operate an AV agent $I_a$, including a vehicle 110. A vehicle path spline is defined by piecewise polynomials that include a series of n connected points in the X, Y plane that includes predicted vehicle 110 trajectories at n future time steps. A vehicle path can include predicted vehicle speed and accelerations at points along the path polynomial. Constraints on a vehicle path polynomial can limit the longitudinal and lateral accelerations to be applied to the vehicle 110 and other vehicles 318, 320, 322, 324, where braking torque and powertrain torque are applied as positive and negative longitudinal accelerations and clockwise and counter-clockwise steering torque are applied as left and right lateral accelerations. A computing device 115 in a vehicle 110 can operate the vehicle 110 to cause the vehicle 110 to travel along a vehicle path by controlling vehicle powertrain, steering and brakes via controllers 112, 113, 114 as discussed above in relation to FIG. 1 at predicted speeds and accelerations.

Commonly used techniques for vehicle path planning for vehicles 110 combine search algorithms with rule-based heuristics. Markov decision processes, reinforcement learning deep neural networks and inverse reinforcement learning deep neural networks are examples of machine learning and optimization techniques that can be used for vehicle path planning. Techniques discussed herein improve vehicle path planning by using game theory based techniques that introduce an alternative approach to path planning that enables a human-like negotiating type solution to the path planning. One main advantage of present techniques is that they avoid constraints of predefined rule-based decisions, neural network fixed input/state/output structure, and the need for exhaustive simulation of the machine learning methods.

Techniques discussed herein discuss a computationally efficient method for path planning derived as a modified version of the Nash equilibrium solution of a multi-agent game. Nash equilibrium solutions are solutions to noncooperative games where each player is assumed to know the strategies of the other players and no one player can gain an advantage by changing strategies unilaterally while the other players keep their optimal strategies unchanged. In techniques described herein, Nash equilibrium solutions are modified by using a grid search based adaptive optimization technique with short-term anticipation that results in a flexible algorithm allowing alternative formulations of the path planning problem that are applicable to different self-driving settings and a changing environment. Grid search based adaptive optimization refers to a computational technique that calculates outcome values based on a grid populated with scores calculated for multiple rewards and penalties for multiple agents including calculating pairwise rewards and penalties for pairs of agents. This technique is referred to as an "adaptiveSeek" solution because it determines optimal solutions based on searching the grid populated with scores for all agents over a finite time horizon h to determine a best (optimal) score for all agents simultaneously.

An adaptiveSeek solution can be performed as a traffic infrastructure centric solution, where vehicle paths are determined by one or more edge computing nodes 170 for multiple AV agents $I_a$ where the AV agents $I_a$ communicate with edge computer nodes 170 included in a traffic infrastructure system 100 that coordinates traffic for a given traffic scene 300. An adaptiveSeek algorithm can determine vehicle paths in the presence of multiple agents using less training data and fewer computing resources than exhaustive simulation or inverse reinforcement learning techniques. Determining vehicle paths in the presence of multiple agents using computing resources in a traffic infrastructure system 100 has an advantage over distributed vehicle path planning where each vehicle or agent is responsible for determining its own path because the AV agents can be operated as thin clients as described above. Thin clients require fewer on-board computing resources, fewer and less complex sensors and less power to operate to determine the same number of vehicle paths. A traffic infrastructure centric solution can use cloud-based computing resources to bring greater computing resources to bear on the problem on demand, thereby providing more efficiency in allocating computing resources while assuring real-time performance. Other examples can be referred to as distributed vehicle path planning where all sensing, data acquisition and vehicle path planning are performed by computing devices 115 included in each of the AV agents $I_a$, with minimal input from edge computer nodes 170 included in a traffic infrastructure system 100. Distributed vehicle path planning can duplicate sensors and computing resources while AV agents $I_a$ all work on aspects of the same problem. In distributed vehicle path planning systems, the edge computer nodes 170 can communicate sensor data from sensors 336 to each of the AV agents $I_a$, for example, to augment sensor data acquired by each of the AV agents $I_a$.

Edge computing nodes 170 can acquire data regarding non-AV agents $I_n$ that do not communicate vehicle paths to the edge computing nodes 170 including other vehicle (non-AV agents) 322, 324 and one or more pedestrians (non-AV agent) 340. Other agents that do not communicate determined vehicle paths or locations to edge computing nodes 170 can include bicycles, animals and static objects, for example. Edge computing devices can use time series data acquired from sensors 336 regarding non-AV agents $I_n$ that do not communicate vehicle paths to determine predicted paths for non-AV agents $I_n$ based on the location and observed motion of the agents. For example, a pedestrian 340, observed to be moving in a crosswalk 338 can be assumed to continue moving within the crosswalk 338 at the observed speed. A non-AV agent $I_n$ can have multiple determined paths in examples where different directions of motion are possible. For example, in traffic scene 300 vehicle 324 can continue straight ahead or turn right. Edge computing nodes 170 can also acquire location information regarding stationary objects that affect traffic in roadways 302 such as traffic barriers, construction signs, and debris.

Figure 4:
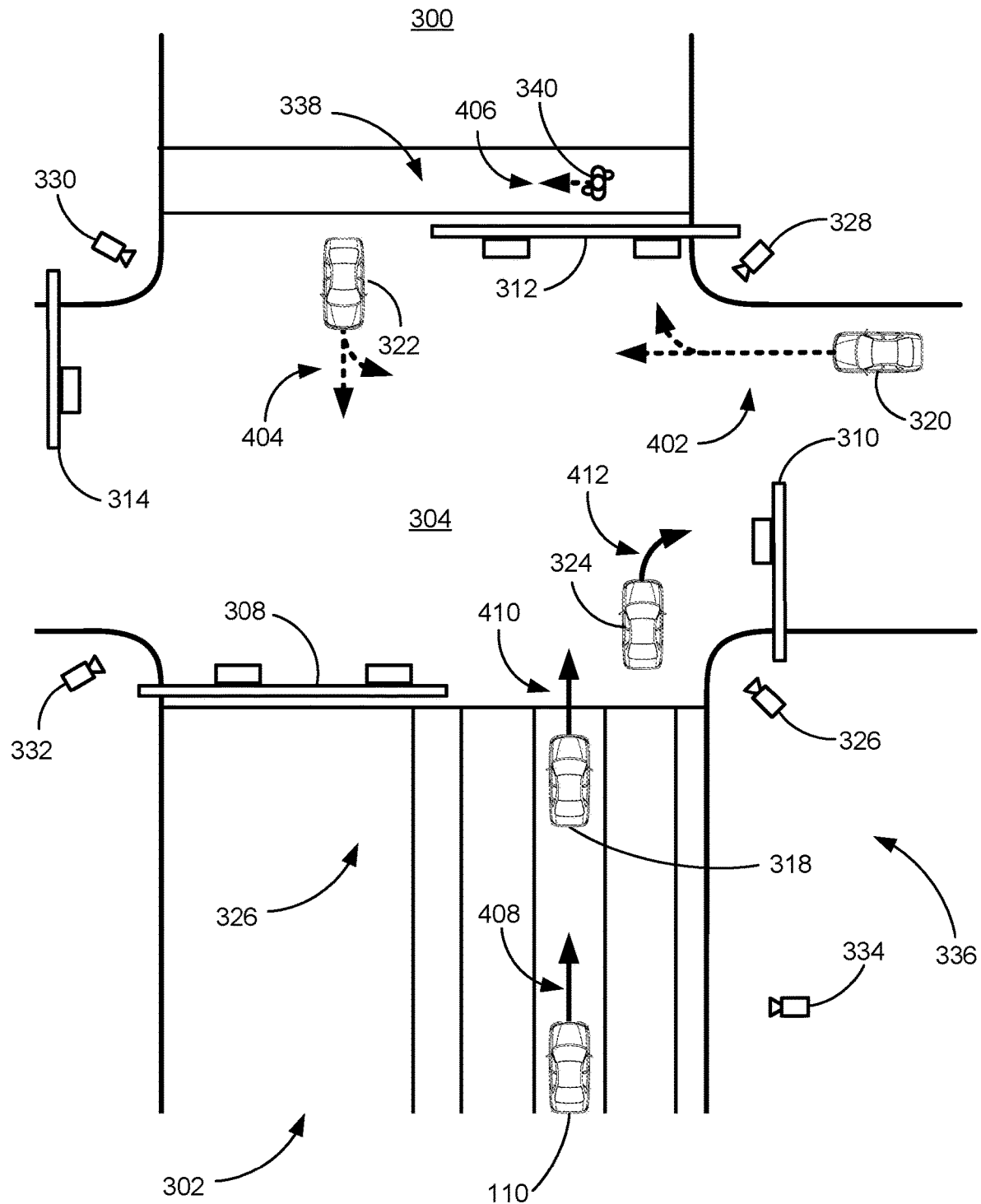
FIG. 4 is a diagram of another example top down view of yet another traffic scene.

FIG. 4 is a diagram of the traffic scene 300 from FIG. 3 with non-AV agent $I_n$ paths 402, 404, 406 (dotted lines with arrows) added. Non-AV agent $I_n$ paths 402, 404, 406 can be determined by an edge computing node 170 in a traffic infrastructure system 100 based on data acquired by sensors 336. An edge computing node 170 in communication with one or more sensors 336 can acquire a time sequence of video images of traffic scene 300 and, using machine vision techniques including convolutional deep neural networks, identify and track objects in the fields of view of sensors 336. By determining the location, orientation and magnification of lenses included in each sensor 336 and thereby determining fields of view 210 corresponding to each sensor 336, the location, speed and direction of each non-AV agent $I_n$ can be estimated. Based on the location of each non-AV agent $I_n$ within the traffic scene 300 and traffic rules corresponding to the locations one or more paths 402, 404, 406 can be predicted for each non-AV agent $I_n$. For example, according to traffic rules corresponding to intersection 304, other vehicle (non-AV agent) 322 is permitted to turn left or go straight, other vehicle (non-AV agent) 320 is permitted to turn right or go straight and pedestrian (non-AV agent) 340 is permitted to continue crossing the roadway 302 within crosswalk 338. By acquiring sensor data from sensors 336 with edge computing nodes 170 included in a traffic infrastructure system 100, processing the data to determine objects states, including locations, speeds, and directions for objects included in the sensor data, and combining the determined locations, speeds and directions with traffic rules determined based on map data, one or more paths 402, 404, 406 can be determined for each non-AV agent $I_n$ included in a traffic scene 300.

An edge computing node 170 included in a traffic infrastructure system 100 can, at a time instant t, receive sensor data from sensors 336, process the sensor data to determine object states for each non-AV agent $I_n$ included in a traffic scene 300, determine vehicle paths for each AV agent $I_a$ and each non-AV agent $I_n$ over a time horizon of length h, determine optimal actions for each of the AV agents $I_a$, and communicate the optimal actions to the AV agents $I_a$. The edge computing node 170 can share the states to all the connected objected in its range. The AV agents can choose to follow the determined optimal actions predicted by the edge computing node 170 or combine the state data with data from their on-board sensors to determine their own optimal actions by implementing the adaptiveSeek algorithm. The edge computing node 170 can perform these activities at a rate of five Hz or greater, where the time horizon length h can be greater than five seconds, for example. The optimal actions are illustrated by vehicle paths 408, 410, 412 for vehicles 324, 318, 110, respectively and can include longitudinal accelerations and steering directions. The optimal actions are determined based on calculating an adaptiveSeek solution as discussed in relation to FIG. 5, below.

Techniques discussed herein can improve operation of AV agents $I_a$ including a vehicle 110 by determining vehicle paths that permit the AV agents $I_a$ to reach a desired destination with maximum allowable speed while avoiding contact with all agents in view of sensors 336 included in a traffic scene 300 by making short-term estimates regarding future states of agents $I_a$ and $I_n$ over a finite time horizon h based on a generic kinematic model. A generic kinematic model is a technique for calculating future object location, speed, and direction based on a bicycle model of vehicle motion, where a vehicle is assumed to have two wheels, with one of the wheels supplying the motive power (driving) and one of the wheels supplying the direction (steering). The bicycle model simplifies calculations of vehicle state while producing accurate results. An adaptiveSeek solution can be calculated for a vehicle-centric system where it is assumed that AV agents $I_a$ are equipped with vehicle sensors including one or more of video cameras, lidar sensors, and radar sensors and a computing device 115 that acquires data from the vehicle sensors and/or edge sensors and can determine a vehicle path based on calculations performed by a computing device 115 included in a vehicle 110. The calculations are identical to the infrastructure-centric solution except only one AV agent $I_a$ (a vehicle 110, for example) is considered.

Figure 5:
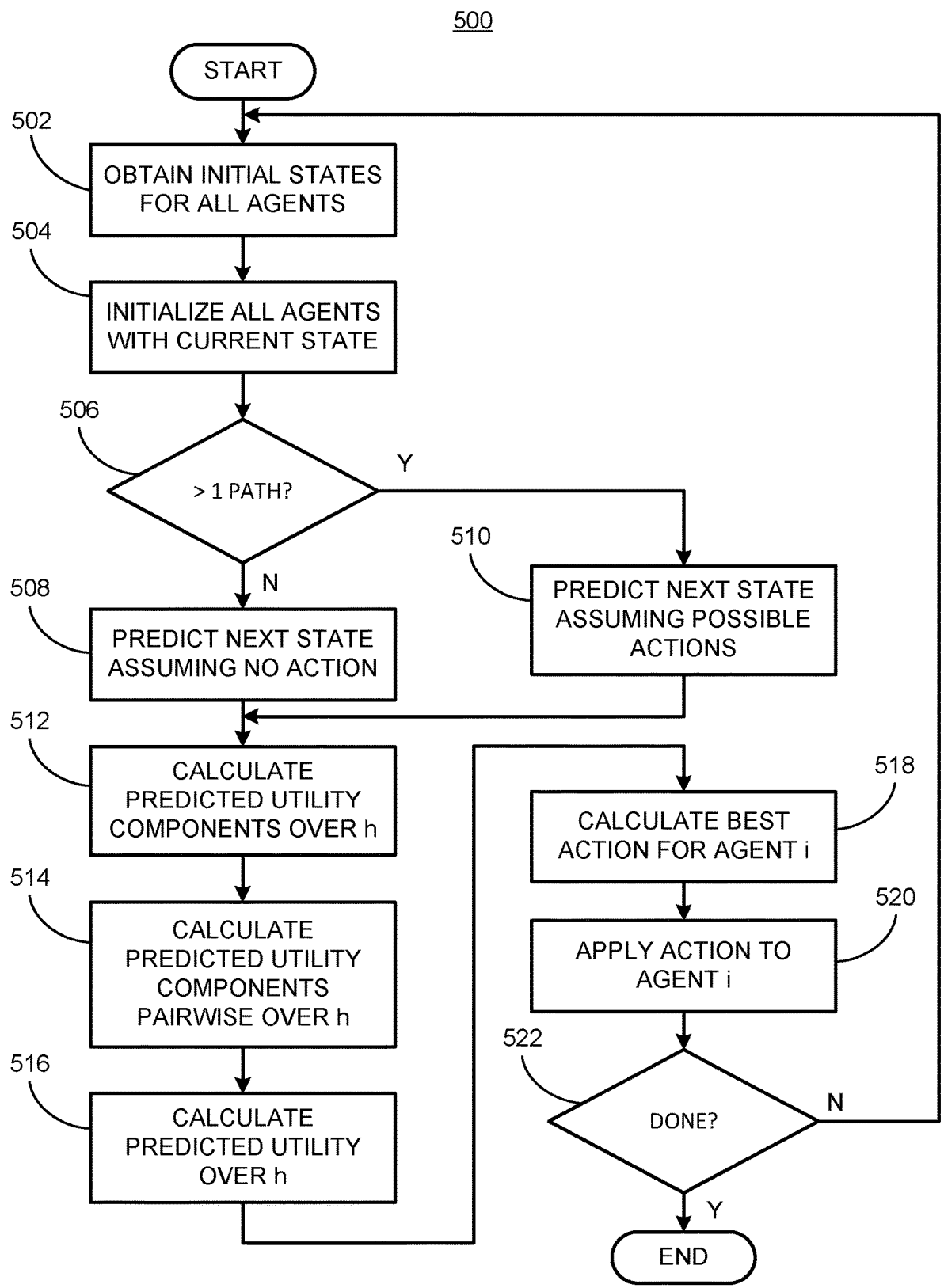
FIG. 5 is a flowchart diagram of an example process to determine an adaptiveSeek solution.

FIG. 5 is a flowchart diagram of a process 500 described in relation to FIGS. 1-4, of a process 500 for determining vehicle actions based on calculating an adaptiveSeek solution to determine optimal actions including vehicle paths for one or more AV agents $I_a$. Process 500 can be implemented by a processor of computing device, taking as input information from sensors, and executing commands, and outputting object information, for example. Process 500 can be implemented at the edge computing device or in-vehicle computing device 115. When implementing in the edge device, data can be acquired from the sensors at edge. When implementing in the vehicle, data can be from both edge and in-vehicle sensors, for example. Process 500 includes multiple blocks that can be executed in the illustrated order. Process 500 could alternatively or additionally include fewer blocks or can include the blocks executed in different orders.

As explained above, an adaptiveSeek solution is a modified version of a Nash equilibrium solution to a multiple agent game where the Nash equilibrium solution is modified using an adaptive grid search optimization technique. Determining the adaptiveSeek solution to the multiple agent game includes calculating rewards and penalties for the multiple agents based on penalty and reward functions $\phi_{i,t}^{(k)}$. Calculating the reward and penalty functions includes simulating behavior of the multiple agents to determine possible future states for the multiple agents to determine the optimal vehicle actions. Vehicle state is defined by the location, speed and direction of a vehicle. The optimal vehicle state is a vehicle path that starts at the current vehicle position and travels to a vehicle destination while maximizing rewards and minimizing penalties. An infrastructure-centric system assumes that the adaptiveSeek solution is determined by an edge computing node 170, where three-dimensional (3D) objects that are not AV agents $I_a$ are identified by the edge computing node 170 as non-AV agents $I_n$ and include human driven vehicles, static objects (road debris, barriers, etc.) and life objects including pedestrians, policemen, animals, etc.

FIG. 5 thus describes a computational framework for implementing human-like decision making for planning paths for multiple autonomous vehicles simultaneously. The adaptiveSeek algorithm described above uses relaxed Nash equilibrium conditions and combines multi-agent real-time simulation, anticipation, and optimization to determine paths for autonomous vehicles using adaptive optimization. Techniques described herein improve upon techniques based on exhaustive simulation and inverse reinforcement learning by modeling the decision process as a technique that optimizes a set of utility functions heuristically and separately. Exhaustive simulation techniques require large amounts of training data to ensure that every variation of every example traffic situation is available to train the system, whether it is rule-based or neural network based. An exhaustive simulation system in general cannot process a scene that has not been presented in training. Inverse reinforcement learning systems depend upon solutions to dynamic programming systems, which in general require simultaneous solutions to sequences of equations. Techniques described herein extrapolate from relatively small datasets of real world data and solve for each agent separately, thereby avoiding expensive real world datasets and time-consuming simultaneous solutions to dynamic programming problems.

Process 500 begins at block 502, where a computing device 115 included in an edge computing node 170 determines initial states for all agents $I=\{I_a, I_n\}$. Object states, including positions and velocities, are measured based on acquired sensor data. Object states of static objects are identified by location and zero velocity. Location and velocity for AV agents $I_a$ can be based on communication with each of the AV agents $I_a$, using network 130, for example. Roadway features including lane markings, traffic signals, etc. can be determined based on combining acquired sensor data and downloaded map data.

At block 504 all agents I are initialized with a current state including location and velocity, determined either by processing acquired sensor data for non-AV agents $I_n$ or by communication with an AV agent $I_a$ via a network 130. Each state $s=[x \ y \ v \ \phi]^T$, which is a transposed vector where x and y are the coordinates of the center of mass of the object, v is the speed and $\phi$ is the inertial heading or direction.

At block 506 a computing device 115 included in an edge computing node 170 determines for each agent I whether the agent I has one possible future path or more than one future path as described above in relation to FIG. 4. For agents I with one future path, process 500 passes to block 508. For agents I with more than one future path, process 500 passes to block 510.

At block 508 a computing device 115 included in an edge computing node 170 determines the change in the state of an agent having one possible future path at time step t according to an input $a=[\alpha \ \delta]^T$, which is a transposed vector where $\alpha$ is the longitudinal acceleration and $\delta$ is the steering angle applied to a kinematic bicycle model of the agent i. A kinematic bicycle mode assumes a vehicle with two front wheels that steer together and two rear wheels on a rigid rear axle, hence vehicle motion can be modeled as if it were a two-wheeled bicycle. The input a is applied to the state s of an agent i at time step t by the following equations:

$$x_{i,t+1} = x_{i,t} + \Delta t v_{i,t} \cos(\varphi_{i,t} + \beta_{i,t}) \tag{1}$$

$$y_{i,t+1} = y_{i,t} + \Delta t v_{i,t} \sin(\varphi_{i,t} + \beta_{i,t}) \tag{2}$$

$$\varphi_{i,t+1} = \varphi_{i,t} + \Delta t \frac{v_{i,t}}{L} \cos(\beta_{i,t}) \tan(\delta_{i,t}) \tag{3}$$

$$\beta_{i,t} = \tan^{-1}\left(\frac{b}{L} \tan(\delta_{i,t})\right) \tag{4}$$

$$v_{i,t+1} = v_{i,t} + \Delta t \alpha_{i,t} \tag{5}$$

Where model parameters L and b correspond to the vehicle wheelbase and the distance from the center of mass to the rear axle and β is the slip angle. Slip angle is the difference between steering angle (direction a wheel is pointing) and the direction the wheel is actually moving with respect to the roadway. Other models, for example dynamic vehicle models that include linear, discrete point mass descriptions, or kinematic models that include double integration to account for both longitudinal and latitudinal accelerations, can be used in addition to equations 1-5.

At block 510 a computing device 115 included in an edge computing node 170 can iterate through all possible paths corresponding to an agent i in examples where more than a single path is determined to be possible for an agent i. In this example, equations 1-5 are calculated for each possible path to predict the next states for each possible path.

At block 512 a computing device 115 included in an edge computing node 170 calculates the predicted utility functions for each agent i over a time horizon h by determining reward and penalty component functions. Reward and penalty functions include rewards for maintaining desired speed $\phi_{i,t}^{(1)}$, smooth acceleration $\phi_{i,t}^{(2)}$, smooth steering $\phi_{i,t}^{(3)}$, penalties for hard braking and acceleration $\phi_{i,t}^{(4)}$, and penalties for lane departure $\phi_{i,t}^{(5)}$, out of road travel $\phi_{i,t}^{(6)}$, and crash penalty with a stationary object $\phi_{i,t}^{(7)}$ based on control variables for acceleration a and steering angle δ according to the following equations:

$$\phi_{i,t}^{(1)} = 1 - \left(\frac{v_{i,t} - v_o}{v_o}\right)^2 \tag{6}$$

$$\phi_{i,t}^{(2)} = (\alpha_{i,t} - \alpha_{i,t-1})^2 \tag{7}$$

$$\phi_{i,t}^{(3)} = (\delta_{i,t} - \delta_{i,t-1})^2 \tag{8}$$

$$\phi_{i,t}^{(4)} = \ln(1 + \exp[\kappa^{(4)}(\alpha - \overline{\alpha})]) + \ln(1 + \exp[-\kappa^{(4)}(\alpha - \underline{\alpha})]) \tag{9}$$

$$\phi_{i,t}^{(5)} = \min[(y_{i,t}^2 - (W/2)^2)^2/(3W^4/4), 1] \tag{10}$$

$$\phi_{i,t}^{(6)} = S(\kappa^{(6)}(|y_{i,t}| - (W+w/2))) \tag{11}$$

$$\phi_{i,t}^{(7)} = S(\kappa_x^{(7)}(x_{i,t} + l_x^{(7)})) \cdot S(-\kappa_y^{(7)}(y_{i,t} - l_y^{(7)})) \tag{12}$$

Where parameter W is the width of the roadway, w is the width of the vehicle, and parameters $\kappa_x$, $\kappa_y$, $l_x$ and $l_y$ define dynamics and a safety envelope between another neighboring object and an AV agent i, where the safety envelope includes a risk premium. A collision penalty $\phi_{i,t}^{(8)}$ between an agent i and another moving agent j assuming rectangular shapes for the agents i, j can be determined by the equation:

$$\phi_{ij,t}^{(8)} = \left[\tilde{S}\left(\kappa_x^{(8)}\left(\Delta x_{ij,t} + l_x^{(8)}\right)\right) + \tilde{S}\left(\kappa_x^{(8)}\left(l_x^{(8)} - \Delta x_{ij,t}\right)\right)\right]. \tag{13}$$

$$\left[\tilde{S}\left(\kappa_y^{(8)}\left(\Delta y_{ij,t} + l_y^{(8)}\right)\right) + \tilde{S}\left(\kappa_y^{(8)}\left(l_y^{(8)} - \Delta y_{ij,t}\right)\right)\right]$$

Where parameters $\kappa_x$, $\kappa_y$, $l_x$ and $l_y$ define the dynamics and safety envelope (risk premium) between the AV agent i and the other moving agent j, and $$S(x) = \frac{1}{1 + e^{-x}}$$

$\tilde{S} \equiv S - \frac{1}{2}$ are the sigmoid function and shifted sigmoid function respectively.

At block 514 a computing device 115 included in an edge computing node 170 determines predicted utility components for each AV agent i over a time horizon h based on the formula:

$$g_k(\phi_{i,t}^{(k)}(a_{i,t}|\tilde{s}_{i,t};h)) \tag{14}$$

The utility transformations are defined using functions $g_k$ that determine the manner in which how the utility components $\phi_{i,t}^{(k)}$ are aggregated over a time period h. For safety critical components, namely out-of-road, crash or collision penalties $\phi_{i,t}^{(6)}$, $\phi_{i,t}^{(7)}$, $\phi_{i,t}^{(8)}$, $g_k()$ is defined as the maximum of the penalties. For moving rewards $\phi_{i,t}^{(1)}$ and lane departure penalty $\phi_{i,t}^{(5)}$, $g_k()$ is defined as the average of the components. For roughness penalty $\phi_{i,t}^{(2)}$, $\phi_{i,t}^{(3)}$, and $\phi_{i,t}^{(4)}$, $g_k()$ is defined by its first time period.

At block 516 a computing device 115 included in an edge computing node 170 determines utility components above, examples of which can be based on equation (6-14), to determine utility functions in a pairwise fashion between an AV agent i and non-moving objects and moving agents j according to crash or collision components $\phi_{i,t}^{(7)}$ and $\phi_{ij,t}^{(8)}$, which can be used to determine penalties for crashes or collisions between AV agents i and non-moving objects and moving agents j. In this example the function $g_k()$ is defined as the maximum of the penalties $\phi_{i,t}^{(7)}$ and $\phi_{ij,t}^{(8)}$.

At block 518 a computing device 115 included in an edge computing node 170 determines the predicted utility for function $\tilde{u}_{i,t}(a_{i,t}|s_{i,t};h)$ based on the equation:

$$\tilde{u}_{i,t}(a_{i,t}|s_{i,t};h) = \Sigma_k w_{i,k} g_k(\phi_{i,t}^{(k)}(a_{i,t}|\tilde{s}_{i,t};h)) \tag{15}$$

The utility function $\tilde{u}_{i,t}(a_{i,t}|s_{i,t};h)$ is updated at each time step t and evaluates the possible alternatives to obtain the optimal action for an AV agent i. The utility function is defined as a weighted sum using weights $w_{i,k}$ to sum functions $g_k$ that determine the manner in which the utility components $\phi_{i,t}^{(k)}$ are aggregated over a time period h in a manner mentioned above. Weights $w_{i,k}$ can be fine-tuned by using optimization technique and real data acquired from vehicles 110 by observing driving behaviors.

At block 518 a computing device 115 included in an edge computing node 170 evaluates the estimated utility function $\tilde{u}_{i,t}(a_{i,t}|s_{i,t};h)$ for an AV agent i over all of the possible pairings with all other agents at a given local range to determine the best action for the AV agent i. Evaluating the estimated utility function in this fashion will avoid collisions involving non-AV agents and will provide the appropriate speedy path to achieve a destination consistent with smooth acceleration, steering and braking.

At block 520 a computing device 115 included in an edge computing node 170 can communicate the determined action (vehicle path) to the AV agent i via a network 130.

At block 522 a computing device 115 included in an edge computing node 170 can increment the value of i and check to see if any more AV agents i remain to be processed. If one or more AV agents i remain to be processed to determine vehicle actions, process 500 loop back to block 502 to begin processing the next AV agent i. If no more AV agents i remain unprocessed, process 500 ends. Alternatively, all autonomous agents can also be processed in parallel, as the proposed algorithm is not intrinsically sequential.

Figure 6:
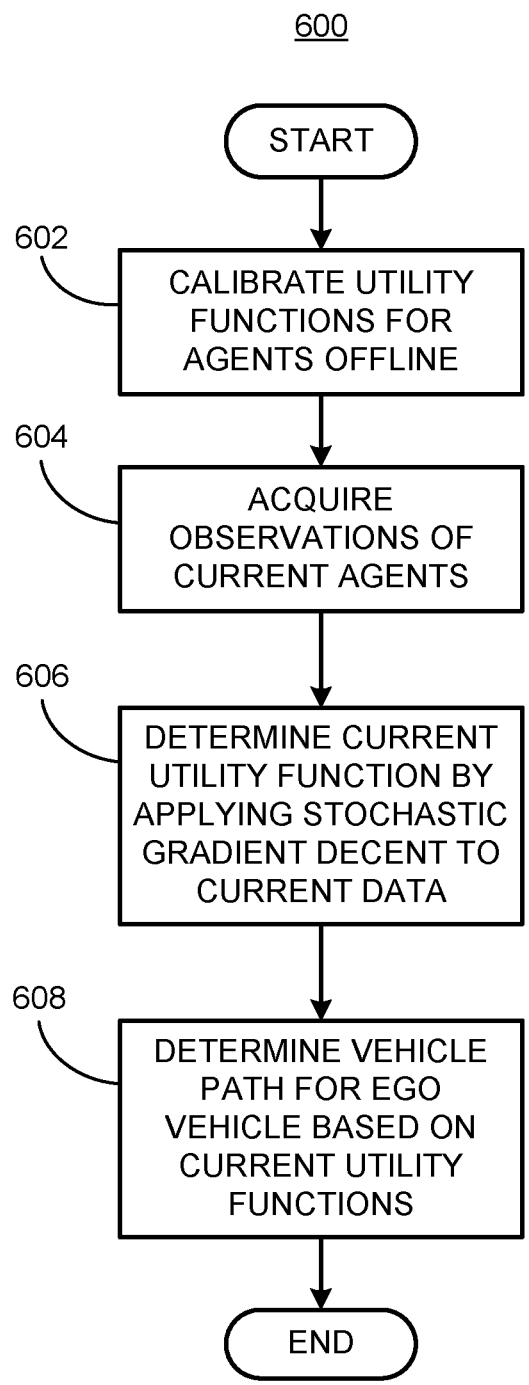
FIG. 6 is a flowchart diagram of an example process to calibrate an adaptiveSeek solution.

FIG. 6 is a diagram of a flowchart describing a process 600 for calibrating utility functions for a grid-based adaptiveSeek solution as described in FIG. 5, above. Process 600 can be used to calibrate the utility functions referenced in blocks 512, 514, and 516 of FIG. 5. Process 600 can be implemented by a processor of computing device, taking as input information from sensors, and executing commands, and outputting object information, for example. Process 600 includes multiple blocks that can be executed in the illustrated order. Process 600 could alternatively or additionally include fewer blocks or can include the blocks executed in different orders.

FIG. 6 describes a technique for calibrating the parameters of the utility functions described above in relation to FIG. 5 above. Calibration is defined as adjusting or updating parameters or values used by a process based on observed external data to make the output of the process anticipate the operation of all agents simultaneously. Calibrating the utility functions described herein can permit the adaptiveSeek algorithm to produce predictable, safe and efficient vehicle routes. A predictable vehicle route can be accurately predicted by a traffic infrastructure system 100 or other vehicles or pedestrians. A safe vehicle path avoids contact or near-contact with other vehicles or pedestrians. An efficient vehicle route minimizes a distance traveled while maximizing vehicle speed within constraints on lateral and longitudinal accelerations. The vehicle routes produced by the adaptiveSeek algorithm do not require any specific behavior of other agents so long as their paths are roughly anticipatable and only require that the behavior of the other agents is consistent with utility functions determined for each agent. A vehicle path that is produced by the adaptiveSeek algorithm will be anticipatable to other vehicles in a traffic scene that also rely on vehicles behaving in expected fashion. Requirements for safety and efficiency of an autonomous vehicle can include avoiding obstacles and other vehicles by a minimum distance, for example 0.5 meters, while maintaining maximum values for acceleration, for example 4.5 m/s². Techniques described herein calibrate the utility functions based on acquiring real world traffic data from both autonomous and non-autonomous vehicles. Calibrating the utility functions can result in an adaptiveSeek algorithm can produce vehicle behavior that is predictable, safe and efficient as defined above.

Techniques described herein for calibrating utility functions are an improvement over policy-based learning algorithms, such as imitation learning because a calibrated adaptiveSeek algorithm can determine policies including vehicle paths more robustly in broader contexts than policy-based learning algorithms. In addition, calibrating an adaptiveSeek algorithm is more computationally efficient as compared to tuning parameters of a reward function used by a reinforcement learning algorithm using inverse reinforcement learning. This is because adaptiveSeek calibration decomposes a dynamic decision process into an independent sequence of static decisions, each of which is based on a set of observed and anticipated states. The observed and anticipated states are described in relation to equations (16) and (17), below. Inverse reinforcement learning techniques are based on solving a more computationally burdensome dynamic programming problem.

At block 602, process 600 calibrates the adaptiveSeek algorithm by acquiring real-world data from one or more video cameras 180 included in a traffic infrastructure system 100. State and size of agents, including vehicles and pedestrians included in the real-world video data is analyzed using known machine vision techniques to determine the location, size, direction, and speed of the agents. Data regarding the location, size, direction and speed of the agents is compared to results of predicting motion of the agents using utility functions of the adaptiveSeek algorithm with initial parameter values to update the parameter values. Techniques described by equations (16)-(28), below, can be used to update the utility function parameters to permit the adaptiveSeek algorithm to progressively more accurately predict agent motion and thereby produce optimal vehicle paths that are predictable, safe and efficient. Techniques described herein that use a game-theoretic approach to predict motion for multiple AV and non-AV agents including vehicles and pedestrians can produce more accurate results using less real-world data and fewer computing resources than other approaches. For example, an adaptiveSeek algorithm as described herein can be calibrated to produce accurate motion predictions for multiple agents using a small fraction of the amount of real-world data required to train a neural network solution to predict motion for even a single agent. An adaptiveSeek algorithm can be calibrated to produce accurate motion predictions for multiple agents using a fraction of the computing resources required to train a neural network using inverse reinforcement learning techniques that rely on simultaneous solutions to multiple dynamic programming problems.

The following paragraphs will discuss the derivation of a gradient-based technique for calibrating an adaptiveSeek algorithm based on real-world data. The gradient-based technique is first used to calibrate utility function parameters using real-world data acquired by one or more video cameras 180 included in a traffic infrastructure system 100. The adaptiveSeek algorithm for determining a vehicle path can be calibrated by first expressing the algorithm discussed in relation to equations (1)-(15) as a solution to a grid search optimization problem:

$$\tilde{a}_{i,t}^*(s_{i,t} \mid \theta_i; h) = \underset{a_i^0}{\mathrm{argmax}}\, \tilde{u}_{i,t}(a_i^0 \mid \tilde{s}_{i,\tilde{t}}; \theta_i; h) \quad (16)$$

Where $\tilde{a}_{i,t}^*(s_{i,t}|\theta_i;h)$ is the calculated action of the i-th agent at time t and state $s_{i,t}$; $\tilde{s}_{i,\tilde{t}}$ is the model-predicted state over the prediction horizon h with $\tilde{s}_{i,0}=s_{i,t}$ and $\theta_i$ is a vector of parameters associated with the utility functions of the i-th agent. The action $\tilde{a}^*_{i,t}(s_{i,t}|\theta_i;h)$ maximizes the effective utility $\tilde{u}_i$ of the i-th agent:

$$\tilde{u}_{i,t}(a_i^0|\tilde{s}_{i,\tilde{t}};\theta_i;h)=\Sigma_k w_{i,k} g_k(\phi_{i,t}^k(a_i^0|\tilde{s}_{i,\tilde{t}};\theta_i);h) \quad (17)$$

Where $\phi_{i,t}^k$ is the k-th component of the original per-time period utility function, and $g_k(\phi_{i,t}^k(a_i^0|\tilde{s}_{i,\tilde{t}};\theta_i);h)$ is a transformation that calculates the anticipation action of the i-th agent with respect to the ego agent with weight $w_{i,k}$, where the ego agent is defined the agent for which a vehicle path is currently being determined. Motions of all other agents are modeled with respect to the ego agent. Equations (16) and (17) describes a grid search performed in the action space defined by:

$$a_i^0 \equiv \{a_i^{(0,l_i)}; l_i=[1,\mathrm{card}(a_i^0)]\} \quad (18)$$

The set of possible actions $a_i^0$ is a vector set of all possible combinations of discretized values of the allowed action space. For example, if the range of acceleration/decelerations values is 5 and the range of steering values is 6, then the number of vectors in $a_i^0$ is 30, i.e. $\mathrm{card}(a_i^0)=30$. The calibration algorithm in process 600 calculates the parameters $\theta_i$ of the utility functions $\tilde{u}_{i,t}$ by comparing the calculated actions $\tilde{a}^*_{i,t}(s_{i,t}|\theta_i;h)$ to observed agent data $a_{i,t}^{obs}(s_{i,t})$.

Assuming that the discrepancy between the model-predicted actions $\tilde{a}^*_{i,t}$ and the measured data $a_{i,t}^{obs}$ can be represented by an independent, identically distributed noise term $\epsilon_{i,t}$ with a normal distribution and a constant covariance $\Omega$, the observed agent data $a_{i,t}^{obs}$ can be expressed as:

$$a_{i,t}^{obs}(s_{i,t})=\tilde{a}^*_{i,t}(s_{i,t}|\theta_i;h)+\epsilon_{i,t} \quad (19)$$

Calibrating the utility function parameters can be formulated as minimization of a cost function $J(\theta_i)$ determined with respect to the vector or parameters $\theta_i$:

$$J(\theta_i) = \frac{1}{2}\sum_t \|a_{i,t}^{obs}(s_{i,t}) - \tilde{a}_{i,t}^*(s_{i,t} | \theta_i; h)\|_\Omega^2 \qquad (20)$$

where $\|z\|_\Omega^2 \equiv z^T\Omega^{-1}z$ is the $\Omega^{-1}$ weighted L2 norm of vector z. In equation (20) we have assumed that there are large numbers of independent observations with sufficient variations for the same agent, which permits the estimation of a utility function at the individual level. In examples where the noise term $\epsilon_{i,t}$ contains serial correlation, the noise term $\epsilon_{i,t}$ can be determined by an autoregressive process such as an AR(1) process, where:

$$\epsilon_{i,t} = \rho\epsilon_{i,t-1} + \tilde{\epsilon}_{i,t} \qquad (21)$$

Where the $\tilde{\epsilon}_{i,t} \sim N(0,\Omega)$ and are independent and have identical distributions (IID). The cost function can then be expressed as:

$$J(\theta_i) = \frac{1}{2}\sum_t \qquad (22)$$
$$\|(a_{i,t}^{obs}(s_{i,t}) - \rho a_{i,t-1}^{obs}(s_{i,t-1})) - (\tilde{a}_{i,t}^*(s_{i,t}|\theta_i;h) - \rho\tilde{a}_{i,t-1}^*(s_{i,t-1}|\theta_i;h))\|_\Omega^2$$

Equation (22) incorporates possible serial correlation of the noise term $\epsilon_{i,t}$ to permit equation (22) to model decision-making at sub-second intervals. This time scale is similar to the time scale of human reflexes where serial correlation is anticipated. A covariance matrix associated with the cost function $J(\theta_i)$ can be estimated using the residuals of the nonlinear regression equations given in equations (20) and (22). Residuals are the noise terms generated by comparing the cost functions $J(\theta_i)$ from (20) and (22).

Although utility functions used in equations (6-14) are smooth functions of the parameter $\theta_i$, the argmax function in equation (16) can mean that $\tilde{a}^*_{i,t}(s_{i,t}|\theta_i;h)$ may not be a smooth function in $\theta_i$. This will preclude the use of gradient-based techniques to minimize the cost functions in equations (6-14). To avoid this problem, a technique disclosed herein is employed to smooth $\tilde{a}^*_{i,t}(s_{i,t}|\theta_i;h)$. Let $\tilde{u}_i^{(l_i)}$ denote the set of utility functions corresponding to the $l_i$-th element of the set of possible actions $a_i^0 \equiv \{a_i^{(0,l_i)}; l_i=[1,\text{card}(a_i^0)]\}$. A maximal entropy transformation can replace the argmax operation in (16) with a differentiable function which maps the set of utility functions $\tilde{u}_i^{(l_i)}$ into a probability distribution of possible actions:

$$P(a_i^{(0,l_i)} | \tilde{s}_{i,\tilde{i}}; \theta_i; h) = \frac{\exp(\lambda\tilde{u}_i^{(l_i)}(a_i^{(0,l_i)} | \tilde{s}_{i,\tilde{i}}; \theta_i; h))}{\sum_{l_i}\exp(\lambda\tilde{u}_i^{(l_i)}(a_i^{(0,l_i)} | \tilde{s}_{i,\tilde{i}}; \theta_i; h))}, \; l_i = [1, \text{card}(a_i^0)] \qquad (23)$$

The value of the maximal entropy transformation (23) will approach the value of the argmax function in equation (16) as $\lambda \to \infty$. Following the property of the distribution $P(a_i^{(0,l_i)}|\tilde{s}_{i,\tilde{i}};\theta_i;h)$ in equation (23), the argmax operation in (16) can be approximated by the expectation of the vectors $a_i^0 = \{a_i^{(0,l_i)}, l_i=[1,\text{card}(a_i^0)]\}$ over the distribution $P(a_i^{(0,l_i)}|\tilde{s}_{i,\tilde{i}};\theta_i;h)$ for a constant but large value of $\lambda$:

$$\underset{a_i^0}{\text{argmax}}\, \tilde{u}_i(a_i^0 | \tilde{s}_{i,\tilde{i}}; h; \theta_i) \approx \sum_{l_i} a_i^{(0,l_i)} P(a_i^{(0,l_i)} | \tilde{s}_{i,\tilde{i}}; \theta_i; h) \equiv \bar{a}_{i,t}^*(s_{i,t} | \theta_i; h). \qquad (24)$$

By using the smoothed approximation of the calculated actions per equation (24), the calibration problem as expressed in equation (20) can be formulated as minimization of the cost function:

$$\bar{J}(\theta_i) = \frac{1}{2}\sum_t \| a_{i,t}^{obs}(s_{i,t}) - \bar{a}_{i,t}^*(s_{i,t}|\theta_i;h) \|_\Omega^2. \qquad (25)$$

The function $\bar{J}(\theta_i)$ as defined above is differentiable in a neighborhood of the minimal point $\theta^*_i$. The vector of calibrating parameters $\theta_i$ is the solution of the optimization problem:

$$\theta_i^* = \underset{\theta_i}{\text{argmin}}\, \bar{J}(\theta_i) \qquad (26)$$

and can be obtained by applying any gradient based methods, such as the gradient descent method:

$$\theta_i \leftarrow \theta_i - \kappa \cdot \nabla_{\theta_i}\bar{J}(\theta_i). \qquad (27)$$

The gradient descent algorithm computes the gradient over the entire data set. The learning rate $\kappa$ can be viewed as an additional parameter. This is convenient for off-line calibration assuming that the entire dataset is available. Even assuming that it is differentiable, the cost function $\bar{J}(\theta_i)$ may have very complicated landscape, i.e., there could exist multiple local minima. To avoid being trapped in these suboptimal locations, we could apply stochastic version of the gradient descent to equation (26)

$$\theta_i \leftarrow \theta_i - \kappa \cdot \nabla_{\theta_i}\bar{J}_s(\theta_i), \qquad (28)$$

where $$\bar{J}_s(\theta_i) = \frac{1}{2}\sum_{t \in s} \|a_{i,t}^{obs}(s_{i,t}) - \bar{a}_{i,t}^*(s_{i,t}|\theta_i;h)\|_\Omega^2$$

for a given random sample s from the entire dataset. The gradient search process is repeated many times with different random samples s. The batch size can be regarded as another parameter. Similar smoothing and gradient descent procedures can be applied to the calculation of cost functions $J(\theta_i)$ including AR(1) noise terms as shown in equation (22). Calculation of cost functions (22) using smoothing and gradient descent procedures can be applied to off-line calibration of utility functions for AV and non-AV agents.

At block 604, a video dataset is acquired from one or more video cameras 180 included in a traffic infrastructure system 100. Processing discussed in relation to block 602 occurs when the calibration process is carried out off-line with prior acquired data of a traffic scene. Processing discussed in relation to block 604 is to calibrate the adaptiveSeek algorithm in a traffic infrastructure system 100 to prepare it for acquiring and processing live video data of a traffic scene. Once a traffic infrastructure system 100 is calibrated by the process described in relation to block 602, the traffic infrastructure system 100 can acquire and process live video data. The video dataset includes a vehicle 110 for which a vehicle path is to be determined and one or more other agents including vehicles and pedestrians. The first step in processing live video data using an adaptiveSeek algorithm is to re-calibrate utility functions based on the acquired live video data. Techniques described herein will re-calibrate an adaptiveSeek algorithm based on a limited amount of live video data in real time.

At block 606 the utility functions that have been calibrated off-line at block 602 can be applied to a real-time adaptiveSeek algorithm to an acquired video dataset including multiple agents to determine a vehicle path for a vehicle 110 by re-calibrating the utility functions based on a limited amount of live video data acquired from a traffic scene in real time. In this scenario, the observed dataset is very small, such as when a vehicle 110 is entering the observation area. The amount of video data will not be sufficient for a full-fledged calibration, due to the limited information content in the newly acquired few data points for the agents in the field of view. In this scenario, utility parameters of the visible agents must be determined quickly using limited data. For this purpose, a different calibration strategy is called for. Techniques described herein adapt techniques from block 602 to process the data in the context of few-shot learning. Block 606 starts with utility functions for a similar agent already calibrated by a large dataset as discussed above in relation to block 602. The contexts in which the datasets were acquired for the initial calibration of the utility functions can be somewhat different but similar contexts. For example, the configuration of an intersection included in the current video data can be similar but not exactly the same. In block 604, stochastic gradient descent is performed on the instant error term determined by the equation:

$$\bar{J}_t(\theta_i) = \|a_{i,t}^{obs}(s_{i,t}) - \bar{a}^*_{i,t}(s_{i,t}|\theta_i;h)\|_\Omega^2 \qquad (29)$$

Gradient descent techniques are applied to the instant error term $\bar{J}_t(\theta_i)$ to minimize the difference between the observed behavior of the vehicle 110 and the model-predicted behavior:

$$\theta_i \leftarrow \theta_i - \kappa \cdot \nabla_{\theta_i} \bar{J}_t(\theta_i) \qquad (30)$$

Equation (30) is applied to an existing point in the utility function parameter space that has been previously calibrated with real-world data. Equation (30) implies that the utility function parameters are being adapted with live video data from beginning, generic values consistent with the prior training dataset towards values consistent with the newly observed data. This adaptation using very sparse data is possible because the utility functions are pre-calibrated at block 602 to be close to the context into which the utility functions are being re-calibrated at block 604. Applying utility functions re-calibrated using equation (30) can accurately predict the motion of multiple AV and non-AV agents in the field of view of a traffic infrastructure system 100. For example, detecting a group of pedestrians walking towards a crosswalk can permit an adaptiveSeek algorithm to predict that vehicles on a roadway will stop to let the pedestrians cross.

At block 608 the traffic infrastructure system 100 can determine a vehicle path for a vehicle 110 in the field of view of video cameras 180 included in the traffic infrastructure system 100. A vehicle path is a polynomial function that can be used by a computing device 115 in a vehicle 110 to operate the vehicle. The polynomial function, typically of degree three or less, can be determined based on limits on vehicle lateral accelerations (steering) and longitudinal accelerations (braking and powertrain). The polynomial function can be constrained based on predicted motions of other agents in the field of view. For example the polynomial function can be constrained to maintain limits on closeness of approach to other agents and constrain the vehicle to obey rules of behavior in traffic, i.e., stopping for pedestrians and traffic signals, maintaining speed limits, etc. The vehicle path can be downloaded from the traffic infrastructure system 100 from a server computer 120 to a computing device 115 in a vehicle 110 via a network 130.

Figure 7:
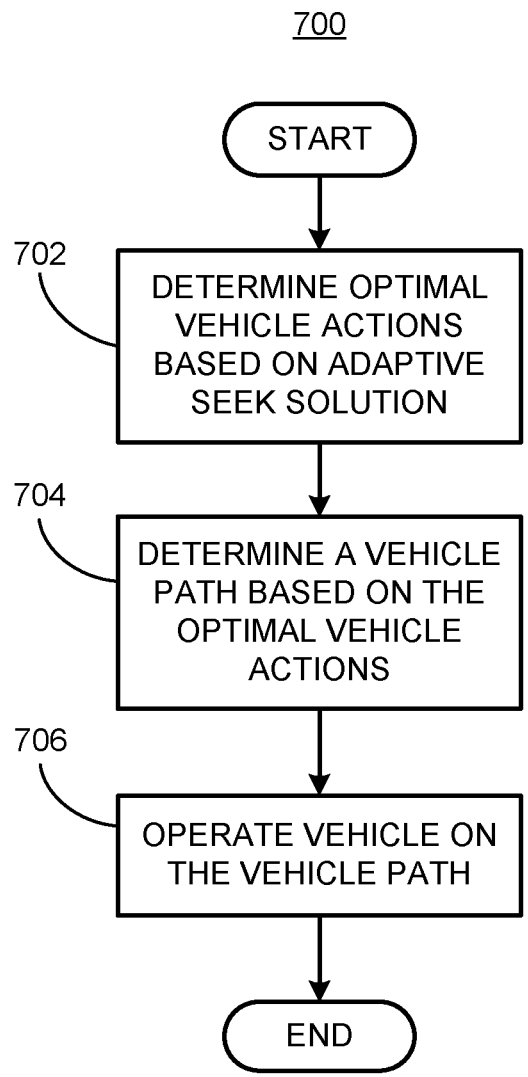
FIG. 7 is a flowchart diagram of an example process to operate a vehicle using an adaptiveSeek solution.

FIG. 7 is a diagram of a flowchart, described in relation to FIGS. 1-6, of a process 700 for operating a vehicle based on calibrating utility function parameters for a grid-based adaptiveSeek solution. Process 700 can be implemented by a processor of computing device, taking as input information from sensors, and executing commands, and outputting object information, for example. Process 700 includes multiple blocks that can be executed in the illustrated order. Process 700 could alternatively or additionally include fewer blocks or can include the blocks executed in different orders.

Process 700 begins at block 702, where an optimal vehicle path is determined for a vehicle 110 by an edge computing node 170 of a traffic infrastructure system 100 based on an adaptiveSeek algorithm as described in relation to FIGS. 5 and 6, above. As discussed above in relation to FIGS. 5 and 6, the adaptiveSeek algorithm is a grid search algorithm that evaluates utility functions for all of the AV and non-AV agents I included in a traffic scene. Each AV agent i is evaluated to determine an optimal action considering all likely actions for AV and non-AV agents and stationary objects. As a result, all actions for all AV agents i including a vehicle 110 will be optimized simultaneously over a finite time period h. The adaptiveSeek algorithm uses observed data regarding the AV and non-AV agents to calibrate the utility functions for each AV and non-AV agent. Calibrated utility functions can improve the performance of an adaptiveSeek algorithm by increasing the accuracy with which the adaptiveSeek algorithm predicts future behavior of AV and non-AV agents.

At block 704 an optimal action for a vehicle 110 is communicated from the edge computing node 170 of the traffic infrastructure system 100 to a vehicle 110. The vehicle 110 can determine a vehicle path based on the optimal action as discussed above in relation to FIG. 6 by combining the optimal action with data acquired by vehicle sensors to determine a path polynomial upon which to operate. Blocks 702 and 704 can also be performed in a vehicle 110 without the help from the edge computing node 170 by using data from onboard sensors and by implementing the adaptiveSeek algorithm of process 500 as illustrated in FIG. 6.

At block 706 the vehicle 110 can operate by using a computing device 115 to control vehicle powertrain, steering and brakes via controllers 112, 113, 114 to operate vehicle powertrain, vehicle steering and vehicle brakes. Following block 706 process 700 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, Scala, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
a processor; and
a memory, the memory including instructions executable by the processor to:
calibrate utility functions that determine optimal vehicle actions based on an approximate Nash equilibrium solution for multiple agents by determining a difference between possible model-predicted states for the multiple agents and observed states for the multiple agents wherein the utility functions simulate behavior of the multiple agents to determine the possible future states for the multiple agents, wherein the utility functions include moving forward at a desired speed and deviating from smooth vehicle operation, wherein the approximate Nash equilibrium solution is determined using an adaptiveSeek solution that searches a grid populated with scores determined based on multiple rewards and multiple penalties for multiple agents to determine optimal scores for future states for multiple agents over a finite time horizon, and wherein the approximate Nash equilibrium solution is updated at multiple time steps within the finite time horizon; and
determine a vehicle path for a vehicle based on the optimal vehicle actions.

2. The computer of claim 1, wherein the difference between the possible future states for the agents and the observed states includes a noise term that is normally distributed with a constant covariance.

3. The computer of claim 1, the instructions including further instructions to calibrate the utility functions by minimizing a cost function determined by the difference between the model-predicted states and the observed states.

4. The computer of claim 1, the instructions including further instructions to determine the observed states based on sensor data acquired from sensors included in a traffic infrastructure system arranged to observe the multiple agents.

5. The computer of claim 1, wherein the utility functions simulate behavior of the multiple agents to determine the possible future states for the multiple agents based on determining one or more of each of agents' locations, agents' velocities, where velocity includes speed and heading, and one or more possible paths for each agent.

6. The computer of claim 5, wherein the utility functions includes parameters that determine rewards and penalties for actions of each of the multiple agents based on estimated states of the multiple agents at future time steps t included within a time horizon h.

7. The computer of claim 1, wherein the approximate Nash equilibrium solution performs an adaptive grid search optimization technique to determine the optimal vehicle actions based on estimating the possible future states of the multiple agents, wherein the multiple agents include one or more of autonomous vehicles, non-autonomous vehicles, stationary objects, and non-stationary objects including pedestrians and the possible future states are estimated by simulating behavior of the multiple agents based on the utility functions to determine the possible future states for the multiple agents.

8. The computer of claim 1, wherein the smooth vehicle operation includes limits on agent acceleration, agent steering and agent braking.

9. The computer of claim 1, wherein the utility functions include one or more of lane departure, out of roadway departure, collisions with stationary objects, and collisions with non-stationary objects.

10. The computer of claim 1, wherein the vehicle path based on the optimal vehicle actions is determined based on polynomial functions.

11. The computer of claim 1, the instructions including further instructions to determine the vehicle path for the vehicle based on the optimal vehicle actions and to download the vehicle path to a second computer including a second processor and second memory included in the vehicle.

12. The computer of claim 11, wherein the second computer includes instructions to operate the vehicle along the vehicle path by controlling vehicle powertrain, vehicle steering and vehicle brakes.

13. A method, comprising:
calibrating utility functions that determine optimal vehicle actions based on an approximate Nash equilibrium solution for multiple agents by determining a difference between model-predicted states for the multiple agents and observed states for the multiple agents wherein the utility functions simulate behavior of the multiple agents to determine the possible future states for the multiple agents, wherein the utility functions include moving forward at a desired speed and deviating from smooth vehicle operation, wherein the approximate Nash equilibrium solution is determined using an adaptiveSeek solution that searches a grid populated with scores determined based on multiple rewards and multiple penalties for multiple agents to determine optimal scores for future states for multiple agents over a finite time horizon, and wherein the approximate Nash equilibrium solution is updated at multiple time steps; and determining a vehicle path for a vehicle based on the optimal vehicle actions.

14. The method of claim 13, wherein the difference between the model-predicted states for the agents and the observed states includes a noise term that is normally distributed with a constant covariance.

15. The method of claim 13, further comprising calibrating the utility functions by minimizing a cost function determined by the difference between the possible model-predicted states to the observed states.

16. The method of claim 13, further comprising determining the observed states based on sensor data acquired from sensors included in a traffic infrastructure system arranged to observe the multiple agents.

17. The method of claim 13, wherein the utility functions simulate behavior of the multiple agents to determine the possible future states for the multiple agents based on determining one or more of each of agents' locations, agents' velocities, where velocity includes speed and heading, and one or more possible paths for each agent.

18. The method of claim 17, wherein the utility functions includes parameters that determine rewards and penalties for actions of each of the multiple agents based on estimated states of the multiple agents at future time steps t included within a time horizon h.

19. The method of claim 13, wherein the approximate Nash equilibrium solution performs an adaptive grid search optimization technique to determine the optimal vehicle actions based on estimating the possible future states of the multiple agents, wherein the multiple agents include one or more of autonomous vehicles, non-autonomous vehicles, stationary objects, and non-stationary objects including pedestrians and the possible future states are estimated by simulating behavior of the multiple agents based on the utility functions to determine the possible future states for the multiple agents.

20. The method of claim 13, wherein the smooth vehicle operation includes limits on agent acceleration, agent steering and agent braking.

* * * * *